United States Patent
Bryant et al.

[15] 3,662,776
[45] May 16, 1972

[54] SELF-PROPELLED SPRINKLER SYSTEM

[72] Inventors: Raymond W. Bryant, Seattle, Wash.; Clifford V. Engel, Beaverton, Oreg.

[73] Assignee: Said Engel, by said Bryant

[22] Filed: Feb. 17, 1970

[21] Appl. No.: 11,951

[52] U.S. Cl. ............................137/344, 239/212, 239/213
[51] Int. Cl. .........................................B05b 9/02, E01h 3/02
[58] Field of Search ...........................137/344; 239/212, 213

[56] References Cited

UNITED STATES PATENTS

| | | | |
|---|---|---|---|
| 3,255,968 | 6/1966 | Stafford | 137/344 X |
| 3,360,200 | 12/1967 | Purtell | 137/344 X |
| 3,361,360 | 1/1968 | Purtell | 239/212 |
| 3,381,894 | 5/1968 | Purtell | 131/344 X |
| 3,498,314 | 3/1970 | Gheen | 137/344 |
| 3,498,542 | 3/1970 | Hefner et al. | 137/344 X |
| 3,512,548 | 5/1970 | Miller | 137/344 |

*Primary Examiner*—Samuel Scott
*Attorney*—Kolisch & Hartwell

[57] ABSTRACT

A self-propelled sprinkler system including an elongated conduit supported, by an upright support frame, in a substantially horizontal position above the ground. A self-contained drive unit is pivotally connected to a lower portion of the support frame for swinging about an upright axis relative to the frame. The drive unit includes a motor, a ground-engaging wheel disposed with its central axis substantially horizontal, and reduction gears drivingly connecting the motor to the wheel. The drive unit can be swung relative to the support frame to position the wheel's axis substantially parallel to the conduit, or at a substantial angle relative thereto, and it may be locked in either position. A disengagable coupling interconnects the wheel and the gears. With the coupling disengaged the wheel rotates freely accommodating towing of the system.

6 Claims, 3 Drawing Figures

Patented May 16, 1972
3,662,776
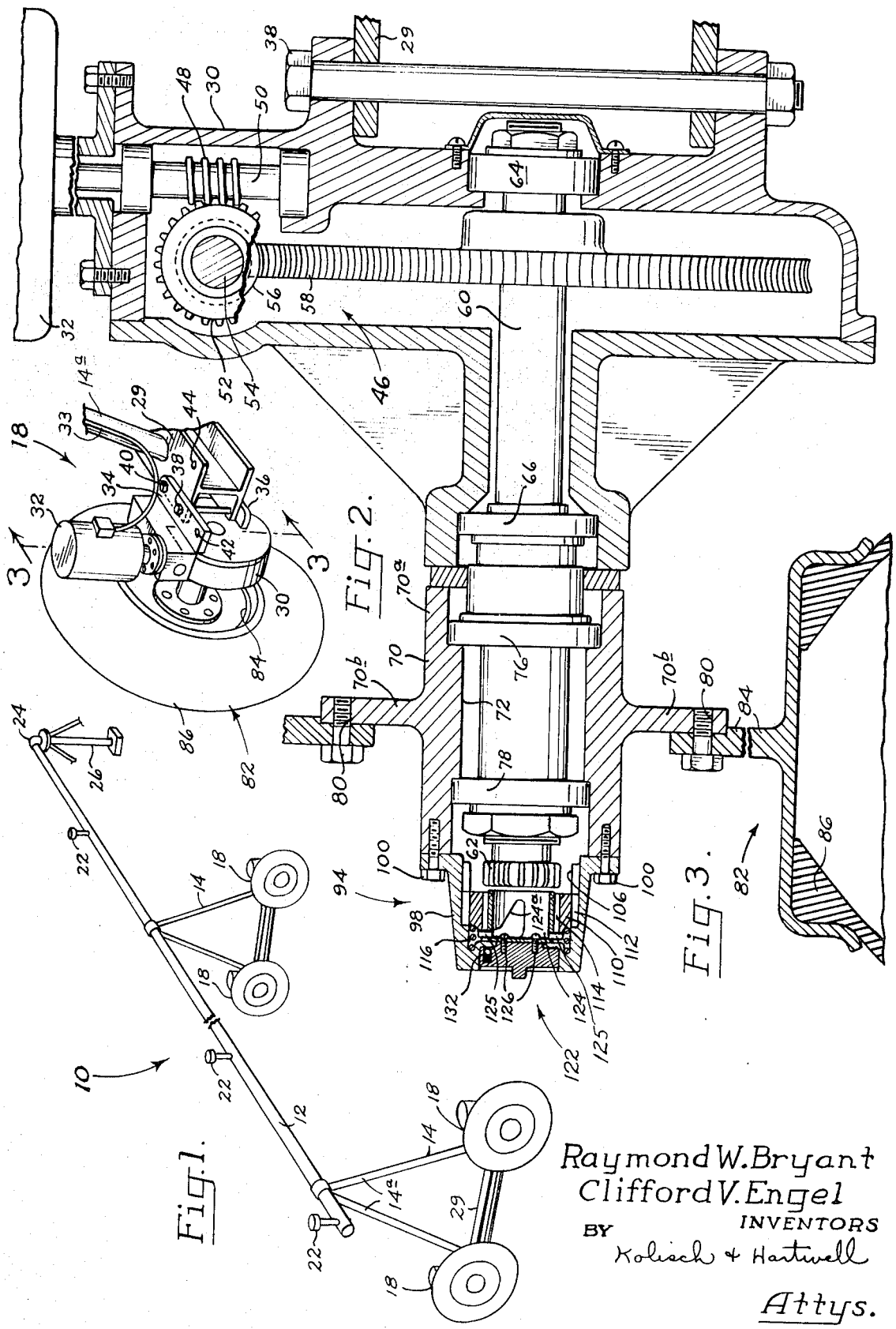
Raymond W. Bryant
Clifford V. Engel
INVENTORS
BY Kolisch + Hartwell
Attys.

SELF-PROPELLED SPRINKLER SYSTEM

This invention relates to a self-propelled sprinkler system and, more specifically, to a drive unit for such a system.

A general object of this invention is to provide, for a self-propelled sprinkler system including an elongated conduit supported above the ground on a movable frame, a novel self-contained, motorized, wheeled drive unit which may be mounted on and will support the frame and conduit for travel over the ground. The drive unit is pivotally connected to the frame whereby it may be swung to place the wheel in different positions relative to the frame. This accommodates moving the system either laterally or longitudinally of the conduit.

Another object is to provide such a sprinkler system wherein the drive unit is so connected to the frame supporting the conduit that the drive unit may be easily removed and replaced.

Yet another object is to provide such a sprinkler system wherein the drive unit includes a disengageable coupling operatively interconnecting the motor and the wheel. With the coupling engaged, operation of the motor drives the wheel to propel the system, and with the coupling disengaged the wheel rotates freely allowing the system to be towed.

These and other objects and advantages will become more fully apparent as the following description is read in conjunction with the drawings, wherein:

FIG. 1 is a simplified perspective view of a sprinkler system constructed in accordance with an embodiment of the invention;

FIG. 2 is an enlarged perspective view of a drive unit in the system illustrated in FIG. 1; and FIG. 3 is an enlarged cross-sectional view taken generally along the line 3—3 in FIG. 2.

Referring now to the drawings, and first more specifically to FIG. 1, at 10 is indicated generally a sprinkler system. In broad terms, the system includes an elongated pipe, or conduit 12, which is supported in a substantially horizontal position above the ground by a series of upright support frames 14, two of which are shown. Each of the frames 14 is supported above the ground for movement over the ground on a pair of self-contained, motorized drive units 18.

A series of laterally spaced-apart sprinkler heads 22 are secured to the top of pipe 12 and communicate with the interior of the pipe. The end of the pipe nearest the viewer in FIG. 1 is closed and the far end is connected, through a rotatable coupling 24, to a vertical pipe 26. Pipe 26 may be connected to a source of water under pressure, whereby water will be supplied to conduit 12 and sprayed from sprinkler heads 22.

Frames 14 are all similar in construction. Thus, the frame includes a pair of upright posts 14a which are connected at their upper set of ends to a strap 28. Strap 28 tightly encircles pipe 12 to secure frame 14 thereto. The lower set of ends of posts 14a are secured, as by welding, to opposite ends of an elongated I-beam 29 which extends horizontally therebetween. As is best seen in FIG. 2, the I-beam is positioned with its flanges horizontal and with its central web vertical.

Referring to FIG. 2 for an explanation of how a drive unit is constructed, each drive unit includes a housing 30. An electric motor 32, supplied current through electrical leads 33, is mounted on top of the housing with its output shaft extending vertically downward. A pair of substantially parallel, and vertically spaced-apart, elongated ears 34, 36 project horizontally outwardly to one side of housing 30. Ears 34, 36 fit over the upper and lower flanges, respectively, of I-beam 29.

A pin 38 extends vertically through aligned accommodating bores in ears 34, 36 and the flanges of I-beam 29 to pivotally connect the drive unit to a lower portion of the support frame. This pin connection provides an upright pivot axis about which the drive unit may be swung relative to the support frame to various adjusted positions. The drive unit is locked in the position shown in FIG. 2 by a locking pin 40 which extends downwardly through accommodating bores in ear 34 and the upper flange of I-beam 29. A bore 42 extends vertically through ear 34 on the opposite side of pin 38 from locking pin 40. Another bore 44 extends vertically through the upper flange of I-beam 29 in a position diagonally opposite locking pin 40. With locking pin 40 removed from the position shown in FIG. 2, the drive unit may be swung about pin 38 in a counterclockwise direction as viewed from above. With the drive unit swung 90° in this counterclockwise direction, bores 42, 44 are aligned and pin 40 may be inserted therethrough to lock the drive unit in this new position. The purposes and advantages of this swinging and locking feature will be described more fully below.

Referring now specifically to FIG. 3, it will be seen that housing 30 houses a speed reduction gear assembly indicated generally at 46. Included in the assembly is a worm gear 48 mounted for rotation about a vertical axis on a shaft 50 which is drivingly connected to the shaft of motor 32. A gear wheel 52, having gear teeth engaging worm 48, is secured to a shaft 54 mounted for rotation about a horizontal axis in the housing. Also secured to and rotatable with shaft 54 is another worm gear 56. Another gear wheel 58, having gear teeth engaging worm 56, is secured to an axle 60.

Axle 60 projects horizontally outwardly through the left side of housing 30 in FIG. 3 and projects a short distance to the right of gear wheel 58. The left end of the axle has a plurality of elongated splines 62 defined thereon. The splines extend parallel to the axis of the axle and are disposed about the periphery of this end of the axle.

A bearing 64 rotatably supports the right end of the axle in the housing and a bearing 66 rotatably supports the axle where it extends through the left side of the housing. Bearings 64, 66 also act as thrust bearings to inhibit axial shifting of the axle.

A wheel mount 70, having a hub 70a, through which a bore 72 extends, is received on that portion of the axle which extends outwardly from housing 30, with the axle extending through bore 72. A pair of spaced bearings 76, 78 support wheel mount 70 for rotation on axle 60. Bearings 76, 78 also act as thrust bearings to prevent shifting of the wheel mount 70 axially on the axle.

Wheel mount 70 also includes a flange 70b which projects radially outwardly from and encircles hub 70a. Flange 70b has a series of radially spaced-apart threaded bores, such as those indicated at 80, extending therethrough parallel to axle 60.

A wheel 82, including a rim 84 and a tire 86 mounted thereon (see FIGS. 2 and 3), is secured to wheel mount 70 by a series of bolts 88 which extend through accommodating bores in rim 84 and are screwed into bores 80. The wheel thus is mounted for rotation about the longitudinal axis of axle 60.

Secured to the far left end of hub 70a, as seen in FIG. 3, adjacent the left end of axle 60, is a disengagable coupling indicated generally at 94. The purpose of this disengagable coupling, as will be seen more clearly from the description to follow, is to permit the wheel mount and wheel either to be drivingly connected to or disconnected from axle 60. The wheel mount and wheel, therefore, either may be driven by the motor through the axle or may rotate freely about the axle.

Coupling 94 includes a cup-shaped member 98 which is secured to the left end of hub 70a, by a series of bolts 100, with its interior encompassing the left end of axle 60. The interior of member 94 has a series of splines 106 defined thereon which extend parallel to splines 62 on the axle and are spaced radially outwardly therefrom.

An annular engaging member 110 is mounted within member 98 for sliding movement in reverse directions parallel to the axis of axle 60. Engaging member 110 has elongated splines 112 defined about its outer surface which slidably engage splines 106. The interior surface of member 110 has a series of elongated splines 114 defined thereon which are adapted to engage splines 62 on the axle. Member 110 is shiftable from the disengaged position shown in solid outline in FIG. 3, where it is disengaged from axle 60, to the right in FIG. 3 to an engaged position where its interior splines 114 engage splines 62 on the axle. With member 110 in its disengaged position the wheel mount and wheel may rotate freely about the axle. When member 110 is shifted to its engaged position it drivingly connects the wheel mount to the axle, whereby powered rotation of axle 60 rotates wheel mount 70 and wheel 82. A compression spring 116 is interposed between member 98 and member 110 and urges member 110 to move toward the right and into engagement with axle 60.

Means for adjusting member 110 between its engaged and disengaged positions is indicated generally at 122. This adjusting means includes a cup-shaped cam member 124 which is mounted in member 98, interiorly of member 110, for rotation about an axis coinciding with the axis of axle 60. The cam has a pair of curved cam surfaces such as that indicated at 124a, defined therein which engage a pair of pins 125 secured to and projecting radially inwardly from member 110. The cam is so constructed that on being rotated in one direction about its axis, it permits spring 116 to move pins 125 and member 110 to the right in FIG. 3 and into engagement with splines 62 on the axle. On rotation of the cam in the opposite direction the cam surfaces engage pins 125 and shift member 110 to the left in the figure to its disengaged position shown in solid outline.

Cam 124 is secured by screws 126 to a rotatable knob 130. Knob 130 may be grasped and turned to rotate the cam in either direction to adjust the position of member 110. A portion of a spring-biased ball 132 mounted in knob 130 is received within an indentation in member 98 when the knob is turned to place member 110 in its disengaged position and is received in another indentation when the knob is rotated to shift member 110 to its engaged position, thus to releasably hold the knob and cam member 110 in their selected positions.

Explaining the operation of the system for sprinkling a field, the drive units are locked in the positions illustrated in FIGS. 1 and 2 with axle 60 and, thus the axis of rotation of wheel 82, extending substantially parallel to pipe 12. Engaging member 110 of the disengagable coupling is placed in its engaged position, whereby motor 32 is operatively connected through gear assembly 46 to wheel 82. Operation of motor 32 drives gear assembly 46, axle 60 and wheel 82 to move the system over the ground in a direction laterally of pipe 12. With one end of pipe 12 connected to rotatable coupling 24 the sprinkler system will travel in a circular path about pipe 26. Water supplied through pipe 26 to pipe 12 will be sprayed out through sprinkler heads 22 to water the area over which the sprinkler system travels.

It is often necessary to move such a sprinkler system from one area to another area. Generally, the most convenient method for accomplishing this is to tow the system with a tractor, or other powered vehicle, in a direction substantially paralleling the sprinkler pipe 12. With the construction of the system of this invention this is easily accomplished.

To arrange the system for such towing operation, and referring specifically to FIG. 2, locking pin 40 is removed from the position shown in FIG. 2 and the drive unit, including wheel 82, is rotated 90° about pin 38, in a counterclockwise direction as viewed from above, to place bore 42 in alignment with bore 44. Locking pin 40 is then inserted through these aligned bores to lock the drive unit in its new position. With the drive unit so repositioned, the axis of axle 60, and thus the axis of rotation of wheel 82, are positioned horizontal and at 90° to pipe 12. Cam 124 is rotated to shift member 110 to its disengaged position, whereby the wheel is disengaged from its operative connected with motor 32 and is permitted to rotate freely about axle 60. After all of drive units 82 have been shifted to this new position and the engaging members in all disconnectable couplings have been shifted to their disengaged positions, pipe 12 is disconnected from rotatable pipe coupling 24 and the system may be towed easily to a new location.

Should it become necessary to repair a drive unit, it is a simple matter to remove the drive unit from the sprinkler system and replace it with a similar unit. In this way there is only minimal down time for the sprinkler system and the drive unit requiring repair may be taken to a shop. To remove a drive unit from the system, it is necessary only to remove pin 38 and locking pin 40 and disconnect the electrical lead to motor 32. A replacement unit then may be mounted quickly on the support frame and the sprinkler system continues working while the replaced drive unit is repaired.

From the above it will be seen that a sprinkler system is provided which includes drive units which may be easily replaced should such become necessary. Further, the drive units may be easily and quickly shifted from a propelling arrangement to a towing arrangement.

With the drive unit including an enclosed gear housing and with the motor being mounted directly thereon, there is little, if any, problem with entanglement of crops, as has been a problem in some previous sprinkler system drive designs.

While an embodiment of the invention has been described herein, it should be obvious to those skilled in the art that variations and modifications are possible without departing from the spirit of the invention.

It is claimed and desired to secure by letters patent:

1. In a self-propelled sprinkler system including an elongated conduit and an upright frame supporting the conduit in a substantially horizontal position above the ground,
   a self-contained drive unit comprising a housing, a motor on said housing, a ground-engaging wheel rotatably mounted on the housing, and means enclosed in said housing operatively connecting said motor and wheel, whereby actuation of the motor rotates the wheel,
   mounting means spaced laterally of said wheel pivotally mounting said housing on said frame adjacent a lower portion of said frame with the central axis of the wheel substantially horizontal, said mounting means providing an upright axis spaced laterally of said wheel about which the drive unit may be swung between a position in which the axis of the wheel extends substantially parallel to the conduit and another position in which the axis of the wheel extends at a substantial angle relative to the conduit, and
   means for locking said drive unit in one of said positions.

2. The sprinkler system of claim 1, wherein said means operatively interconnecting said motor and wheel comprises a speed reduction gear assembly.

3. The sprinkler system of claim 1, wherein said means operatively interconnecting said motor and wheel comprises a disengagable coupling accommodating selective disconnecting of said wheel from said motor.

4. The sprinkler system of claim 1, wherein said means operatively interconnecting the wheel and motor includes a speed reduction gear assembly drivingly connected to the motor, a rotatable axle driven by said gear assembly on which axle the wheel is rotatably mounted, with the axis of the wheel coinciding with the axis of the axle, and a disengagable coupling having one adjusted position in which it operatively connects the wheel to the axle and another adjusted position in which the wheel is permitted to rotate freely about the axle.

5. The sprinkler system of claim 1, wherein said mounting means and locking means are disconnectable accommodating removal of the drive unit from the frame.

6. The sprinkler system of claim 1, wherein said mounting means comprises a pin connection between said housing and said frame spaced laterally of said wheel.

* * * * *